(12) United States Patent
Müller et al.

(10) Patent No.: US 6,606,904 B2
(45) Date of Patent: Aug. 19, 2003

(54) FILLING LEVEL GAGE

(75) Inventors: Roland Müller, Steinen (DE); Wolfram Lütke, Inzlingen (DE)

(73) Assignee: Endress + Hauser Gmbh + Co., Maulburg (DE)

( * ) Notice: Subject to any disclaimer, the term of this patent is extended or adjusted under 35 U.S.C. 154(b) by 0 days.

(21) Appl. No.: 09/923,431

(22) Filed: Aug. 8, 2001

(65) Prior Publication Data

US 2002/0040596 A1 Apr. 11, 2002

(30) Foreign Application Priority Data

Oct. 10, 2000 (DE) .......................................... 100 49 995

(51) Int. Cl.$^7$ .............................................. G01F 23/00
(52) U.S. Cl. ................... 73/290 V; 73/290 V; 343/703; 324/639; 342/124
(58) Field of Search ....................... 73/290 V; 343/703; 324/639; 342/124

(56) References Cited

U.S. PATENT DOCUMENTS

| | | | | |
|---|---|---|---|---|
| 4,675,854 A | * | 6/1987 | Lau .............................. | 367/98 |
| 4,700,569 A | * | 10/1987 | Michalski et al. ......... | 73/290 V |
| 4,785,664 A | * | 11/1988 | Reebs ........................ | 73/290 V |
| 5,365,178 A | * | 11/1994 | Van Der Pol ............... | 324/644 |
| 5,659,321 A | * | 8/1997 | Burger et al. ............... | 342/124 |
| 5,689,265 A | * | 11/1997 | Otto et al. ................... | 342/124 |
| 6,054,946 A | * | 4/2000 | Lalla et al. ................. | 342/124 |
| 6,266,022 B1 | * | 7/2001 | Muller et al. ............... | 343/703 |

FOREIGN PATENT DOCUMENTS

| | | |
|---|---|---|
| DE | 4431886 A1 | 5/1995 |
| EP | 0592584 B1 | 1/1997 |
| EP | 1083413 A1 | 3/2001 |

OTHER PUBLICATIONS

Patent Abstracts of Japan, 10197617A, Jul. 31, 1998, Sekine Keitaro et al, Radio Wave Type Liquid Level Gauge.

* cited by examiner

*Primary Examiner*—Helen Kwok
*Assistant Examiner*—André K. Jackson
(74) *Attorney, Agent, or Firm*—Jones, Tullar & Cooper, P.C.

(57) ABSTRACT

A filling level gage operating with microwaves, for measuring a filling level of a filling material (5) in a container (1), is provided which functions with a single antenna (7) constructed as simply as possible, and in which a minimum distance required for measurement between the filling material (5) and the antenna (7) is as small as possible, having a microwave generator (9), and an antenna (7) with planar antenna structure, which is used to transmit the microwaves in the direction of the filling material (5) and to receive microwaves reflected from a filling material surface, in which the planar antenna structure has at least two transmission and/or reception elements (11, 13, 33, 35, 37, S, E).

14 Claims, 5 Drawing Sheets

FILLING LEVEL GAGE

BACKGROUND OF THE INVENTION

The invention relates to a filling level gage operating with microwaves, for measuring a filling level of a filling material in a container, having a microwave generator and an antenna with planar antenna structure, which is used to transmit the microwaves in the direction of the filling material and to receive microwaves reflected from a filling material surface. In these filling level gages, a time of flight of the microwaves from the device to the filling material surface and back is normally established by means of a reception and evaluation circuit, and the current filling level is determined therefrom.

During the measurement of a filling level, microwaves are transmitted to the surface of a filling material by means of an antenna, and echo waves reflected from the surface are received. An echo function representing the echo amplitudes as a function of distance is formed, from which the probable useful echo and its time of flight are determined. The distance between the filling material surface and the antenna is determined from the time of flight.

The European patent application filed on Jul. 9, 1999 with the application number 99 11 7604.1 describes an antenna with planar antenna structure, which is suitable for filling-level measurement.

Such planar antennas are also described in the book "Einführung in die Theorie und Technik planarer Mikrowellenantennen in Mikrostreifenleitungstechnik" [Introduction to the theory and technology of planar microwave antennas in microstrip line technology] Gregor Gronau, Verlagsbuchhandlung Nellissen-Wolff or in the journal article "Impedance of radiation slot in the ground plane of a microstrip line", IEEE Trans. Antennas Propagat., Vol AP-30, pages 922–926, May 1982.

To determine the filling level, it is possible to employ all known methods which make it possible to measure comparatively short distances by means of reflected microwaves. The best known examples are pulse radar and frequency modulation continuous wave radar (FMCW radar).

In pulse radar, periodically short microwave transmission pulses, referred to below as wave packets, are transmitted, are reflected from the filling material surface and are received again after a distance-dependent time of flight. The received signal amplitude as a function of time is the echo function. Every value of this echo function corresponds to the amplitude of an echo reflected at a certain distance from the antenna.

In the FMCW method, a continuous microwave is transmitted which is periodically linearly frequency-modulated, for example with a sawtooth function. The frequency of the received echo signal therefore exhibits a frequency difference, which depends on the time of flight of the echo signal, with respect to the instantaneous frequency which the transmission signal has at the time of reception. The frequency difference between the transmission signal and the reception signal, which can be found by mixing the two signals and evaluating the Fourier spectrum of the mixed signal, hence corresponds to the distance of the reflecting surface from the antenna. Further, the amplitudes of the spectral lines of the frequency spectrum obtained by Fourier transformation correspond to the echo amplitudes. This Fourier spectrum therefore represents the echo function in this case.

During the measurement of a filling level using only one antenna, the problem arises that meaningful measurement of the filling level is possible only if the filling level does not fall below a minimum distance from the antenna. This minimum distance, which is often referred to as the blocking distance, is due to the fact that a reception signal resulting from transmission must first have decayed to an amplitude lying below the echo amplitude before the echo signal reflected by the filling material surface can be reliably detected and evaluated.

This problem can be substantially solved by using two separate antennas, one of which is used to transmit and one to receive microwaves. But this solution requires the container to have two openings at a suitable separation, through which the two antennas can be inserted. This is, however, not the case in most applications.

EP-B 592 584 describes a filling level gage operating with microwaves, having
a microwave generator and
an antenna,
  which is used to transmit the microwaves in the direction of the filling material and to receive microwaves reflected from a filling material surface,
  in which a transmission element and a reception element are arranged.

Crosstalk from the transmitter to the receiver is reduced here by generating microwaves polarized linearly in a first polarization plane and passing them through a phase shifter. The phase shifter is dimensioned so that the emerging microwaves are e.g. left-circularly polarized. As a result of reflection from the filling material surface, correspondingly right-circularly polarized microwaves are then received and converted into linearly polarized microwaves by means of the phase shifter. The polarization plane of these microwaves is perpendicular to the first polarization plane. The receiver is designed so that it only receives microwaves with this polarization, but does not pick up microwaves polarized along the first polarization plane.

Such an antenna, however, is very expensive to produce since it requires corresponding filters and phase shifters. Further, it is comparatively large as a result, and power is lost every time the microwaves pass through a filter or phase shifter.

SUMMARY OF THE INVENTION

It is an object of the invention to provide a filling level gage operating with microwaves, which functions with a single antenna constructed as simply as possible, and in which a minimum distance required for measurement between the filling material and the antenna is as small as possible.

To that end, the invention consists of a filling level gage operating with microwaves, for measuring a filling level of a filling material in a container, having
a microwave generator,
an antenna with planar antenna structure,
  which is used to transmit the microwaves in the direction of the filling material and to receive microwaves reflected from a filling material surface,
  in which the planar antenna structure has at least two transmission and/or reception elements.

According to a preferred embodiment of the invention, the transmission and/or reception elements are respectively located in a subregion of the antenna.

According to another preferred embodiment, the transmission and/or reception elements are arranged interleaved.

According to a further embodiment, in order to measure a filling level at a close range in front of the antenna, at least one of the transmission and/or reception elements is used exclusively as a receiver.

According to still another preferred embodiment, in order to measure a filling level at a far range in front of the antenna, all the transmission and/or reception elements are used as transmitters and as receivers.

According to yet a further preferred embodiment, at least one transmission and/or reception element is used exclusively as a transmitter and the remaining transmission and/or reception elements are used exclusively as receivers, and a differential signal is established which corresponds to the difference between the transmission signals applied to the transmitters and the reception signals received by the receivers.

According to an advantageous and preferred embodiment, the microwaves to be transmitted have frequencies which are higher than 20 GHz.

One advantage of the invention is that, owing to the planar antenna structure, the antenna provides a very high degree of flexibility. The antenna structure can, as desired, be split into a plurality of transmission and/or reception elements and each transmission and/or reception element can be used optimally. By means of this, for example, a very high transmission power is available for measurements at far range and, for measurements at close range, splitting the transmission and/or reception elements into pure transmission elements and pure reception elements significantly reduces crosstalk from the transmitter to the receiver. The only additional outlay needed for utilizing these advantages involves corresponding circuit connections of the individual transmission and/or reception elements. This is simple to implement and does not entail any power reduction.

The invention and further advantages will now be described in more detail with the aid of the figures of the drawing, in which four exemplary embodiments are represented; the same parts are provided with the same reference numbers in the figures.

DETAILED DESCRIPTION OF THE PREFERRED EMBODIMENTS

Figure 1:
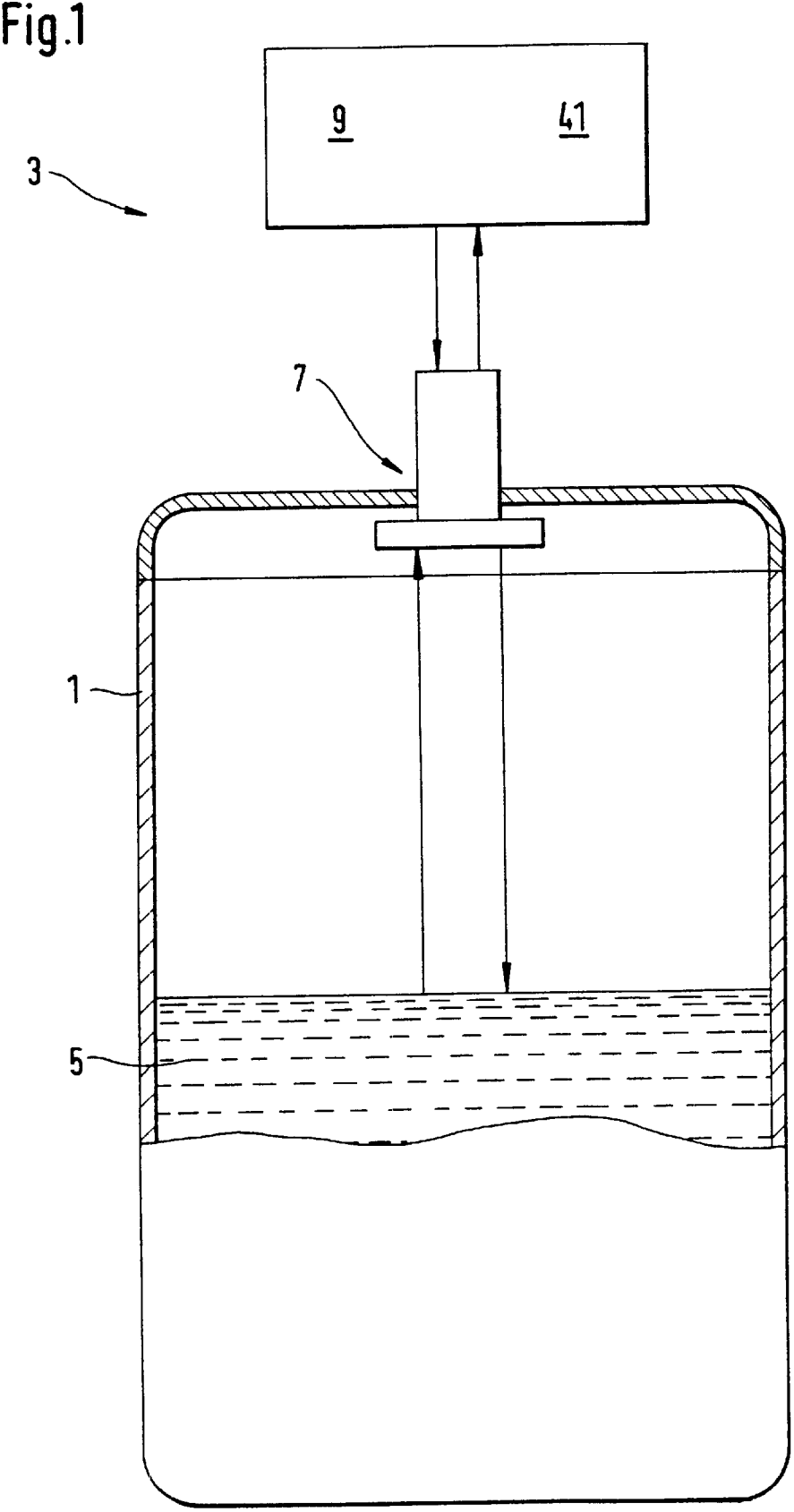
FIG. 1 schematically shows a measurement arrangement having a filling level gage operating with microwaves arranged on a container.

FIG. 1 schematically shows a measurement arrangement having a filling level gage 3 operating with microwaves arranged on a container 1. The filling level gage 3 is fastened to the container 1 e.g. by means of a flange connection. The container 1 is filled with a filling material 5 whose filling level is to be measured.

The filling level gage 3 comprises an antenna 7, having a planar antenna structure which will be described in more detail below in connection with the exemplary embodiments represented in FIGS. 2 to 5. The antenna 7 protrudes into the container 1 and is used to transmit microwaves in the direction of the filling material 5 and to receive microwaves reflected from a filling material surface. To that end, the planar antenna structure has at least two transmission and/or reception elements. The filling level gage 3 has a microwave generator 9. Examples of suitable microwave generators 9 include a pulse radar device constructed in planar circuit technology, an FMCW radar device constructed in planar circuit technology or a continuously oscillating microwave oscillator constructed in planar circuit technology.

The microwave generator 9 respectively feeds those transmission and/or reception elements that are used either exclusively as transmitters or as transmitters and as receivers.

Microwaves with frequencies above 20 GHz, e.g. 24 GHz, are preferably generated and transmitted. Above 20 GHz, the wavelength of the microwaves is small enough for comparatively small planar antenna structures to be usable. At 24 GHz, for example, a plurality of transmission and/or reception elements can be fitted comfortably on an antenna structure having a diameter of from a few centimeters to one or two decimeters. These small dimensions have the advantage that the antenna 7 is correspondingly small and can therefore be inserted easily even through container openings of small rated width.

The microwaves are transmitted to the filling material surface by the transmission and/or reception elements used as transmitters, and the microwaves reflected from the filling material surface are received by the transmission and/or reception elements used as receivers. The incoming microwaves are fed to a reception and evaluation circuit 41, which establishes a time of flight of the microwaves to the filling material surface and back, and determines the current filling level therefrom.

Figure 2:
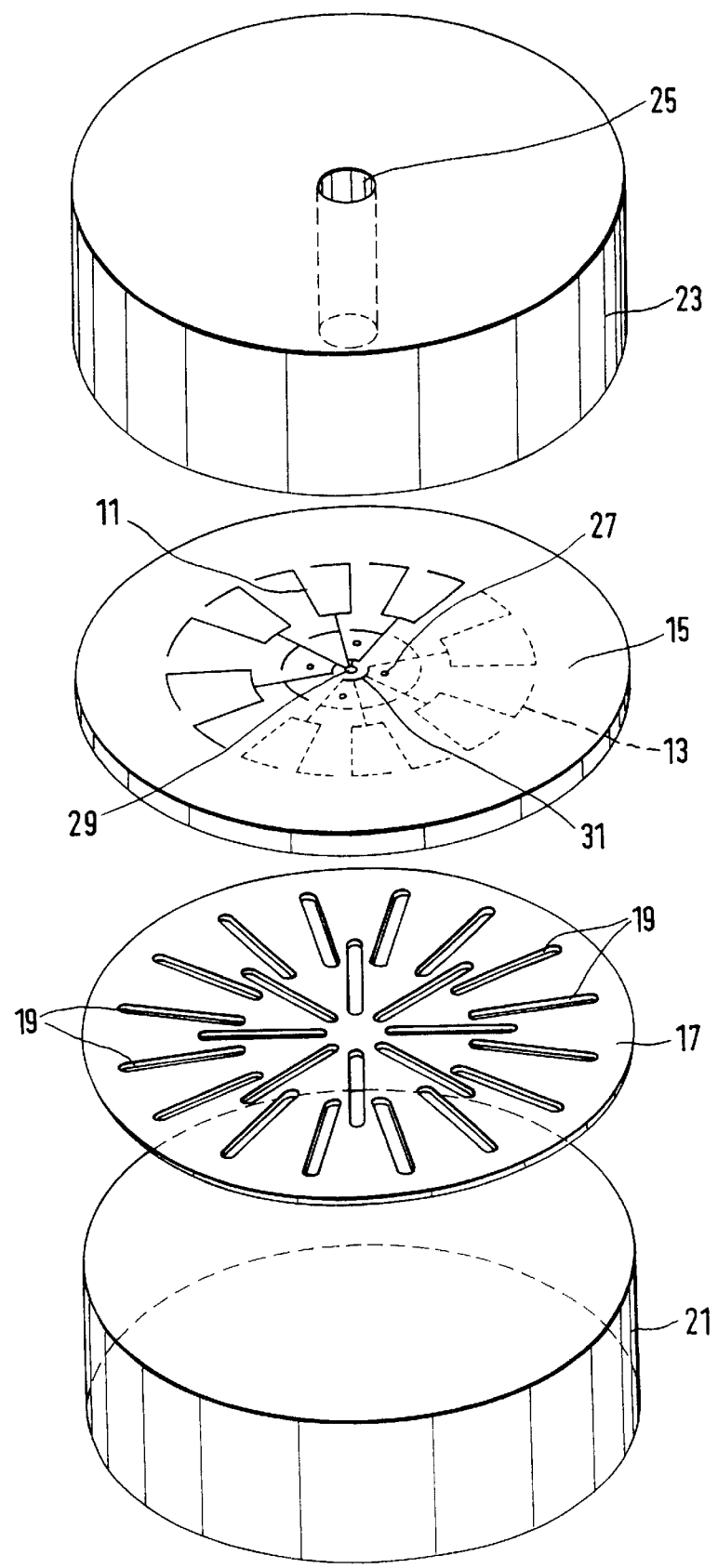
FIG. 2 shows a schematic representation of a planar antenna structure, which has a first transmission and/or reception element and, arranged in a different part of the antenna structure, a second transmission and/or reception element.

FIG. 2 schematically shows an exemplary embodiment of a planar antenna structure which has a first (represented in FIG. 2 by solid lines) and a second (represented in FIG. 2 by broken lines) transmission and/or reception element 11, 13. The transmission and/or reception elements 11, 13 are metal structures which are fitted on a side of a dielectric substrate 15 facing away from the filling material 5. On a side of the dielectric substrate facing the filling material, a conductive layer 17 is provided, e.g. in the form of a coating of the dielectric substrate 15, which has holes 19 whose shape and arrangement is preferably selected so that only electromagnetic waves of a desired mode are radiated. In the exemplary embodiment represented, the holes 19 are slots extending radially outward, which are particularly suitable for transmitting the TE-01 mode.

On a side of the conductive layer 17 facing away from the dielectric substrate 15, a protective layer 21 that consists of a dielectric is provided. This protective layer 21 forms the termination of the antenna in the direction facing the filling material. A chemically stable material, e.g. polytetrafluoroethylene (PTFE) or a composite material made of polytetrafluoroethylene and ceramic and/or glass fibers, is therefore preferably to be used as the dielectric.

On a side of the substrate 15 facing away from the conductive layer 17 and, during operation, away from the filling material 5, a further dielectric disk 23 is provided. The disk 23 has a hole 25 through which a contact element (not represented in FIG. 2) can be inserted. The contact element is designed so that it makes a connection with each transmission and/or reception element 11, 13. The electrical contact of the conductive layer 17 to ground or to a fixed reference potential also preferably takes place via this contact element. To that end, it is either possible to provide continuous bores 27 in the substrate, through which correspondingly shaped and arranged pins of the contact element can be guided to the conductive layer 17, or to guide contact pins that are connected to the conductive layer 17 at the same place through the substrate 15.

In the exemplary embodiment represented in FIG. 2, the first transmission and/or reception element 11 is arranged in a first part of the antenna structure, and the second transmission and/or reception element 13 is arranged in a second part of the antenna structure. Each of the transmission and/or reception elements 11, 13 is a structure extending radially outward in the form of a branch, which respectively fills a semicircle of the substrate 15. The branches of the first transmission and/or reception element 11 converge at a point 29 in the middle of the substrate, where contact of the first transmission and/or reception element 11 with the contact element takes place. The branches of the second transmission and/or reception element 13 converge in a circle segment 31 close to the middle of the substrate, where contact of the second transmission and/or reception element 13 with the contact element takes place.

Figure 3:
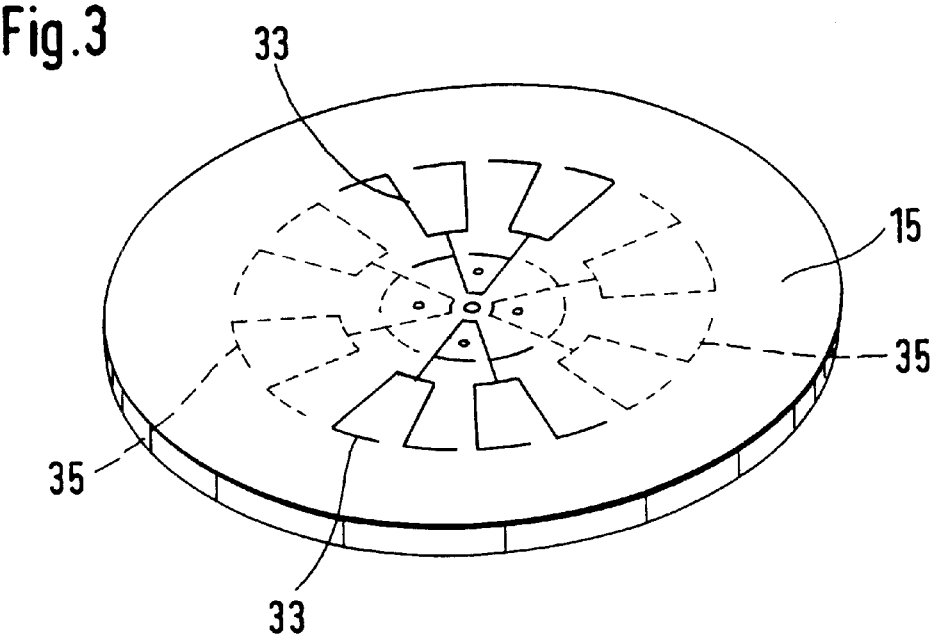
FIG. 3 shows a schematic representation of a planar antenna structure, which has two transmission and/or reception elements arranged mutually opposite, which are separated from one another by two further transmission and/or reception elements arranged mutually opposite.

FIG. 3 shows a schematic representation of another planar antenna structure. For the sake of simplicity, only the substrate 15 with the structure applied to it is represented here. The other components can be taken identically from the previous exemplary embodiment. The planar antenna structure has two transmission and/or reception elements 33 which are arranged opposite one another and are separated from one another by two further transmission and/or reception elements 35 that are arranged opposite one another. The circular surface of the substrate 15 is thereby split into four quarter-circles. By corresponding design of the contact element, it is possible to make contact with the four transmission and/or reception elements 33, 35 either each individually or in pairs.

Figure 4:
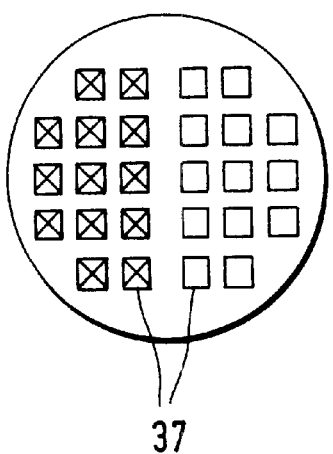
FIG. 4 shows a schematic representation of a planar antenna structure, which has a plurality of transmission and/or reception elements arranged in a first antenna half, and a plurality of transmission and/or reception elements arranged in a second antenna half.
Figure 5:
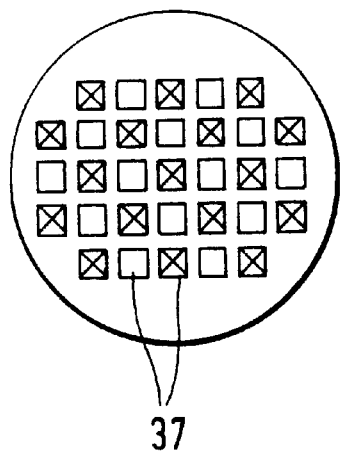
FIG. 5 shows a schematic representation of a planar antenna structure, which has a plurality of transmission and/or reception elements arranged interleaved in a checkerboard pattern.

FIGS. 4 and 5 represent two other exemplary embodiments of planar antenna structures, which each have a plurality of transmission and/or reception elements 37. In these exemplary embodiments as well, only the substrate 15 with the structure applied to it is represented for the sake of simplicity. The other components can be taken identically from the previous exemplary embodiment.

Each transmission and/or reception element 37 occupies a small area in comparison with the substrate surface, and is symbolically represented by a box. Here again, naturally, contact can be made individually with each transmission and/or reception element 37, e.g. by providing a corresponding number of bores in the dielectric layer 23, through which the contact takes place.

Preferably, however, a plurality of transmission and/or reception elements 37 are joined together, e.g. according to the function. For instance, as represented in FIG. 4, all the transmission and/or reception elements 37 arranged in the right-hand part of the substrate and all the transmission and/or reception elements 37 arranged in the left-hand part of the substrate may be connected together to form a functional block. The allocation is indicated symbolically in FIG. 4 by marking half of the transmission and/or reception elements 37 with a cross.

In the exemplary embodiment represented in FIG. 5, such an allocation to functional blocks is likewise marked by crosses. Here, two functional blocks are provided and the associated transmission and/or reception elements 37 are arranged interleaved in a checkerboard pattern.

The design of the antenna with a planar antenna structure which has at least two transmission and/or reception elements, according to the invention, offers a high degree of flexibility in terms of the use of the individual transmission and/or reception elements.

Preferably, when measuring a filling level at a close range in front of the antenna 7, at least one of the transmission and/or reception elements is used exclusively as a receiver. The effect achieved by this is that an interference signal at the receiver, due to transmission, decays very much more quickly and has a very much lower amplitude than would be the case if this transmission and/or reception signal were also used for transmission. The blocking distance of the filling level gage designed in this way is correspondingly smaller.

Figure 6:
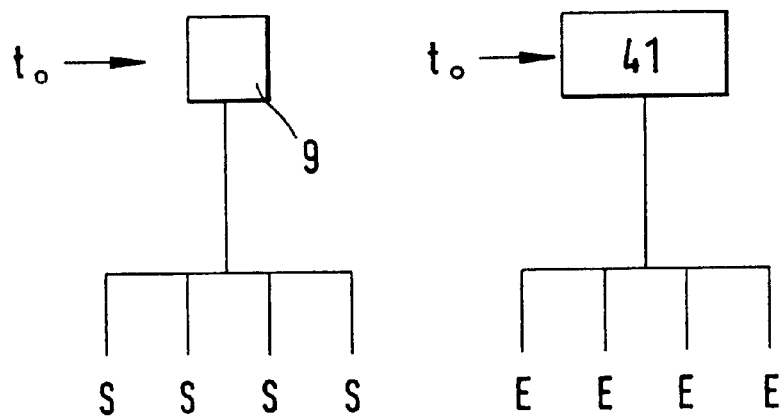
FIG. 6 shows a block diagram of a filling level gage according to the invention, in which some transmission and/or reception elements operate as transmitters and some transmission and/or reception elements operate as receivers.

The simplest form in which this can be done is represented in FIG. 6 in the form of a block diagram. All the transmission and/or reception elements present are split into those which are used exclusively as transmitters, denoted by S in FIG. 6, and those which are exclusively used as receivers, denoted by E in FIG. 6. The transmitters S are fed by the microwave generator 9, and the receivers E forward the reception signals that they receive to the reception and evaluation circuit 41. The reception and evaluation circuit 41 establishes the time of flight of the microwaves from the filling level gage to the filling material surface and back, and determines the current filling level therefrom. To that end, a time basis is necessary, which is represented merely symbolically by a reference time $t_o$ in FIG. 6. The reference time $t_o$ is, for example, a trigger pulse which simultaneously initiates the transmission of a microwave pulse and starts an internal time measurement in the reception and evaluation circuit 41.

It is possible, for example, in the exemplary embodiment represented in FIG. 2, for the first transmission and/or reception element 11 to be used exclusively as a transmitter, and for the second transmission and/or reception element 13 to be used exclusively as a receiver. In the exemplary embodiment represented in FIG. 3, the two transmission and/or reception elements 33 can be used exclusively as transmitters, and the two transmission and/or reception elements 35 can be used exclusively as receivers. In the exemplary embodiments represented in FIGS. 4 and 5, the transmission and/or reception elements 37 provided with a cross can be used exclusively as transmitters and the transmission and/or reception elements 37 without a cross can be used exclusively as receivers. The splitting into transmitters and receivers leads to a significant reduction in the blocking distance.

When measuring at far range in front of the antenna 7, however, less transmission power is available in this case. While splitting into transmitters and receivers is very important at close range, it is immaterial when measuring at far range since the time of flight of the microwaves for these measurements is large compared with the time over which an interference signal due to transmission decays. Preferably, therefore, in the case of measuring a filling level at a far range in front of the antenna 7, all the transmission and/or reception elements are used as transmitters and as receivers. A measure of whether the measurement result is at close range or at far range is e.g. the blocking distance that the filling level gage has when all the transmission and/or reception elements are used as transmitters and as receivers. A test measurement can therefore be taken when setting up, which is used to ascertain the measurement range in which the filling level is situated. Subsequently, for example, the last filling level measured can be used to ascertain this during normal measurement operation. As soon as the filling level comes near to close range, at least one transmission and/or reception element is used exclusively as a receiver. At far range, all the transmission and/or reception elements are used as transmitters and as receivers.

Figure 7:
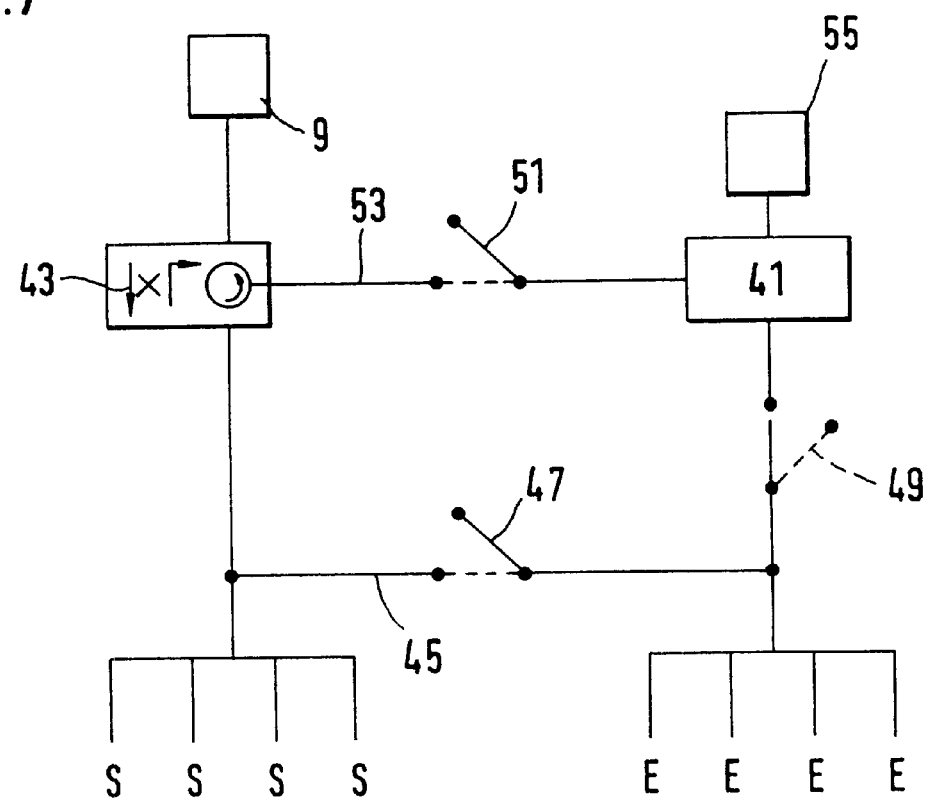
FIG. 7 shows a block diagram of a filling level gage according to the invention, in which, for measurements at close range, a proportion of the transmission and/or reception elements are used exclusively as transmitters and the remaining transmission and/or reception elements are used exclusively as receivers, and in which, for measurements at far range, all the transmission and/or reception elements are used as transmitters and as receivers.

FIG. 7 shows a block diagram of a filling level gage according to the invention, in which, for measurements at close range, a proportion of the transmission and/or reception elements are used exclusively as transmitters and the remaining transmission and/or reception elements are used exclusively as receivers, and in which, for measurements at far range, all the transmission and/or reception elements are used as transmitters and as receivers.

The microwave generator 9 is here connected via a directional coupler or circulator 43 to those transmission and/or reception elements, denoted by S in FIG. 7, which are used exclusively as transmitters for measurements at close range. Correspondingly, the reception and evaluation circuit 41 is connected, for measurements at close range, to those transmission and/or reception elements, denoted by E in FIG. 7, which are used exclusively as receivers for measurements at close range.

When measuring at close range, the block diagram hence corresponds to the block diagram represented in FIG. 6. When measuring at far range, conversely, all the transmission and/or reception elements are connected together via a line 45 connecting the two functional blocks. The line 45 is provided with an electronic switch 47, which is opened when measuring at close range and closed when measuring at far range. Correspondingly, a switch 49 that is closed for measurements at close range and opened for measurements at far range is provided in the connection between the reception and evaluation circuit 41 and the transmission and/or reception elements E that are used exclusively as receivers when measuring at close range. For measurements at far range, the signals received by the transmission and/or reception elements E are combined via the line 45 with the signals received by the transmission and/or reception elements S, and are sent via the directional coupler or circulator 43, via a connection 53 provided with a switch 51, to the reception and evaluation circuit 41. The switch 51 is opened when measuring at close range and closed when measuring at far range.

The switches 47, 49, 51 are controlled by a control circuit 55, which is annexed to the reception and evaluation circuit 41. The current filling level is determined in the reception and evaluation circuit 41 and e.g. compared with a reference value. If the filling level is higher than this reference value, then the subsequent measurement is carried out as a measurement at close range, by the control circuit 55 setting the associated switch positions using control signals. If the filling level is less than this reference value, then the subsequent measurement is carried out as a measurement at far range, by the control circuit 55 setting the associated switch positions using control signals. In order to avoid continually changing the measurement mode in the crossover range at the transition from close range to far range, a hysteresis function may be built in here, e.g. by using two different reference values such that only falling below the lower reference value causes a change from the close range mode to the far range mode, and only exceeding the upper reference value causes a change from the far range mode to the close range mode.

Figure 8:
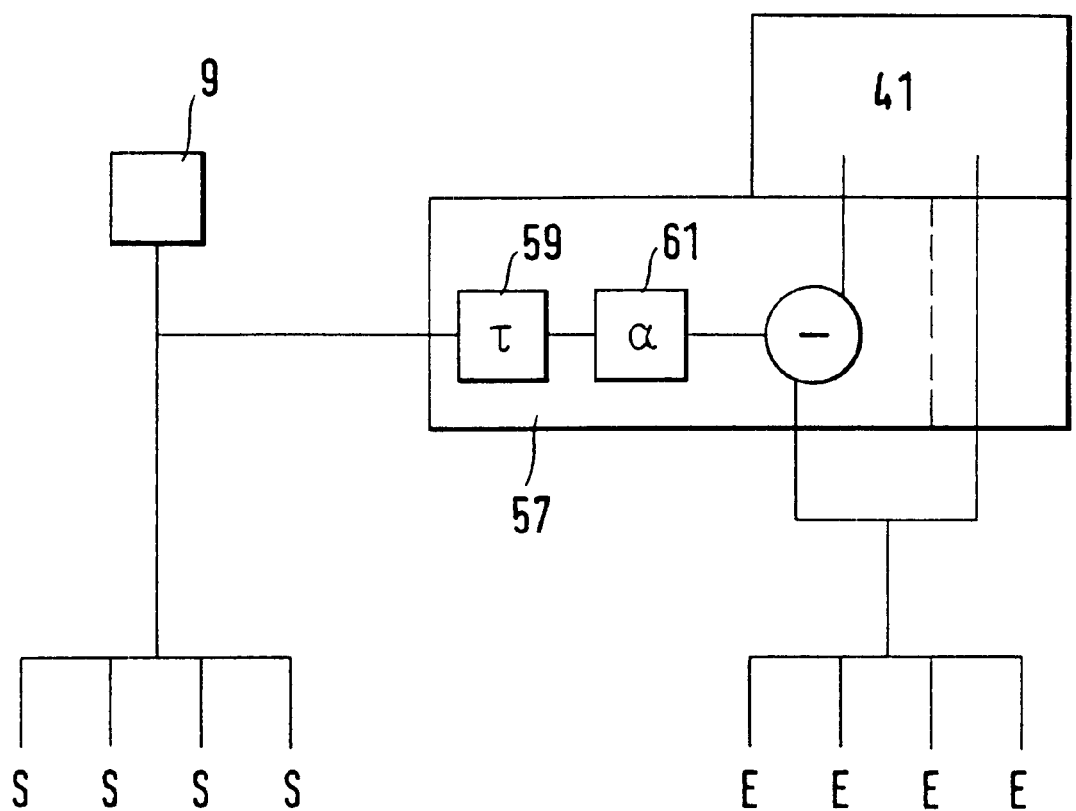
FIG. 8 shows a block diagram of a filling level gage according to the invention, in which some transmission and/or reception elements operate as transmitters and some transmission and/or reception elements operate as receivers, and a difference is taken between a transmission signal and a reception signal, which is used to contribute to the determination of the filling level.

FIG. 8 shows another block diagram of a filling level gage according to the invention. In this filling level gage, at least one transmission and/or reception element S is used exclusively as a transmitter. These transmission and/or reception elements S are connected to the microwave generator 9. The remaining transmission and/or reception elements E are used exclusively as receivers, and are connected to an input of the reception and evaluation circuit 41. A subtraction unit 57 is further provided, which establishes a differential signal that corresponds to the difference between transmission signals applied to the transmitters and reception signals received by the receivers. To that end, one input of the subtraction unit 57 is connected to the microwave generator 9, and another input is connected to the transmission and/or reception elements E. The subtraction may be carried either out by corresponding direct superposition of the signals, or by detecting the incoming signals and recording them in digital form. The recorded data are then subtracted e.g. using a microcomputer. A delay unit 59 and an attenuation unit 61, which permit delay and attenuation of the incoming signal from the microwave generator 9 by an adjustable delay time $\tau$ and an attenuation factor $\alpha$, are advantageously provided. These rescalings may either be carried out in analog fashion by means of corresponding electronic components, or may be performed by computer on the stored data.

The differential signal is used to improve the measurement accuracy and, to that end, it is delivered to the reception and evaluation unit 41. Using differential signals, it is possible to correct almost fully e.g. minor crosstalks from the transmitters to the receivers that exist in spite of the separation of the transmitters and receivers. The characteristic data of the filling level gage that are needed for this, e.g. the delay time $\tau$ and the attenuation factor $\alpha$, can be established by means of factory calibration and stored permanently in the device.

What is claimed is:

1. A filling level gage operating with microwaves, for measuring a filling level of a filling material in a container, having:

a microwave generator, and
an antenna with planar antenna structure which is used to transmit the microwaves in the direction of the filling material and to receive microwaves reflected from a filling material surface, said planar antenna structure has at least two transmission and/or reception elements, and said transmission and/or reception elements are arranged interleaved.

2. The filling level gage operating with microwaves as claimed in claim 1, wherein the transmission and/or reception elements are respectively located in a subregion of said antenna.

3. The filling level gage operating with microwaves as claimed in claim 1, wherein, in order to measure a filling level at a close range in front of the antenna, at least one of the transmission fluid/or reception elements is used exclusively as a receiver.

4. The filling level gage operating with microwaves as claimed in claim 1, wherein the microwaves to be transmitted have frequencies which are higher than 20 GHz.

5. A filling level gage operating with microwaves, for measuring a filling level of a filling material in a container, having:

a microwave generator, and an antenna with planar antenna structure, which is used to transmit the microwaves in the direction of the filling material and to receive microwaves reflected from a filling material surface, said planar antenna structure has at least two transmission and/or reception elements, and wherein in order to measure a filling level at a far range in front of the antenna, all the transmission and/or reception elements are used as transmitters and as receivers.

6. The filling level gage operating with microwaves as claimed in claim 5, wherein the transmission and/or reception elements are respectively located in a subregion of the antenna.

7. The filling level gage operating with microwaves as claimed in claim 5, wherein, in order to measure a filling level at a close range in front of the antenna, at least one of the transmission and/or reception elements is used exclusively as a receiver.

8. The filling level gage operating with microwaves as claimed in claim 5, wherein the microwaves to be transmitted have frequencies which are higher than 20 GHz.

9. A filling level gage operating with microwaves, for measuring a filling level of a filling material in a container, having:

a microwave generator, and an antenna with planar antenna structure, which is used to transmit the microwaves in the direction of the filling material and to receive microwaves reflected from a filling material surface, said planar antenna structure has at least two transmission and/or reception elements, and wherein at least one transmission and/or reception element is used exclusively as a transmitter and the remaining transmission and/or reception elements are used exclusively as receivers, and wherein a differential signal is established which corresponds to the difference between the transmission signals applied to the transmitters and the reception signals received by the receivers.

10. The filling level gage operating with microwaves as claimed in claim 9, wherein the transmission and/or reception elements are respectively located in a subregion of the antenna.

11. The filling level gage operating with microwaves as claimed in claim 9, wherein, the transmission and/or reception elements are arranged interleaved.

12. The filling level gage operating with microwaves as claimed in claim 9, wherein, in order to measure a filling level at a close range in front of the antenna, at least one of the transmission and/or reception elements is used exclusively as a receiver.

13. The filling level gage operating with microwaves as claimed in claim 9, wherein, in order to measure a filling level at a far range in front of the antenna, all the transmission and/or reception elements are used as transmitters and as receivers.

14. The filling level gage operating with microwaves as claimed in claim 9, in which the microwaves to be transmitted have frequencies which are higher than 20 GHz.

* * * * *